Feb. 9, 1960　　　F. M. SALISBURY ET AL　　　2,924,025
QUESTION AND ANSWER DEVICE
Filed May 6, 1957　　　　　　　　　　　　　　3 Sheets-Sheet 1

INVENTORS
Frank M. Salisbury and
Edmund O. Carmody
BY Walter H. Popp.
ATTORNEY

Feb. 9, 1960     F. M. SALISBURY ET AL     2,924,025
QUESTION AND ANSWER DEVICE

Filed May 6, 1957     3 Sheets-Sheet 2

Frank M. Salisbury & Edmund O. Carmody INVENTORS
BY Walter H. Popp.
ATTORNEY

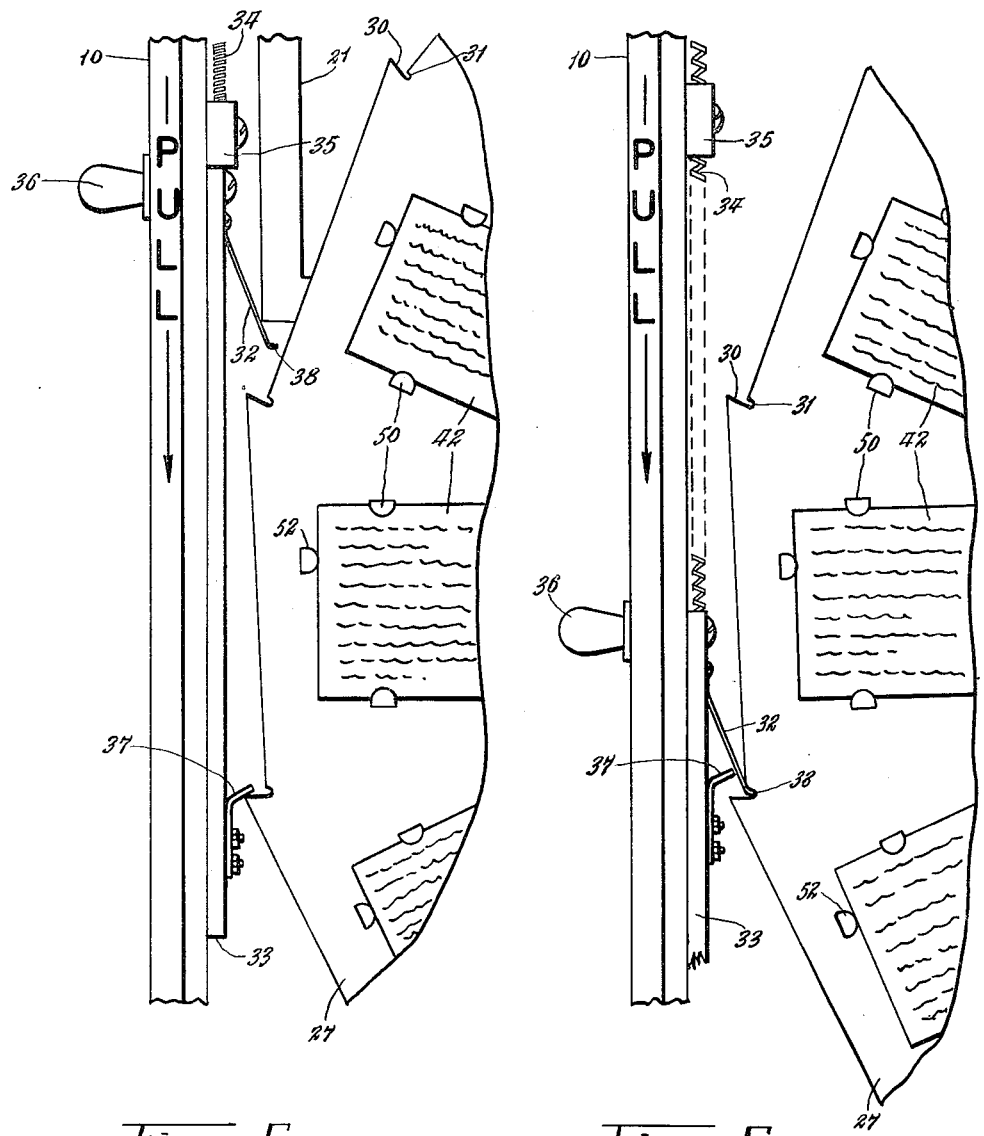

United States Patent Office 2,924,025
Patented Feb. 9, 1960

2,924,025

QUESTION AND ANSWER DEVICE

Frank M. Salisbury and Edmund O. Carmody, Buffalo, N.Y., assignors to Carmody Corporation, Buffalo, N.Y.

Application May 6, 1957, Serial No. 657,239

4 Claims. (Cl. 35—9)

This invention relates to a question and answer mechanism which in general comprises a shallow cabinet in which the movable question and answer mechanism is located, the front and back faces of said cabinet each being provided with a question and answer window so that the person using the device will only be able to see one of the questions on the one side of the cabinet and also be able to see, when the shutter is lifted, the answer to its companion question.

The object of the invention is to provide a simple and inexpensive mechanism of this character which will accurately index the questions and corresponding answers and to enable the mechanism which contains the questions and answers to be easily removed bodily from the cabinet so that a different set of questions and answers can be substituted on either the one or both sides of the number which carries the questions and answers. Other collateral objects of the invention and practical solutions thereof are disclosed in the accompanying following specifications and accompanying drawings herein:

Figure 5 is a greatly enlarged fragmentary front elevation of the advancing mechanism of the device, shown in its retractable position.

Figure 6 is a greatly enlarged fragmentary front elevation similar to Figure 5 but showing the advancing mechanism in its fully advanced position.

Figure 1:
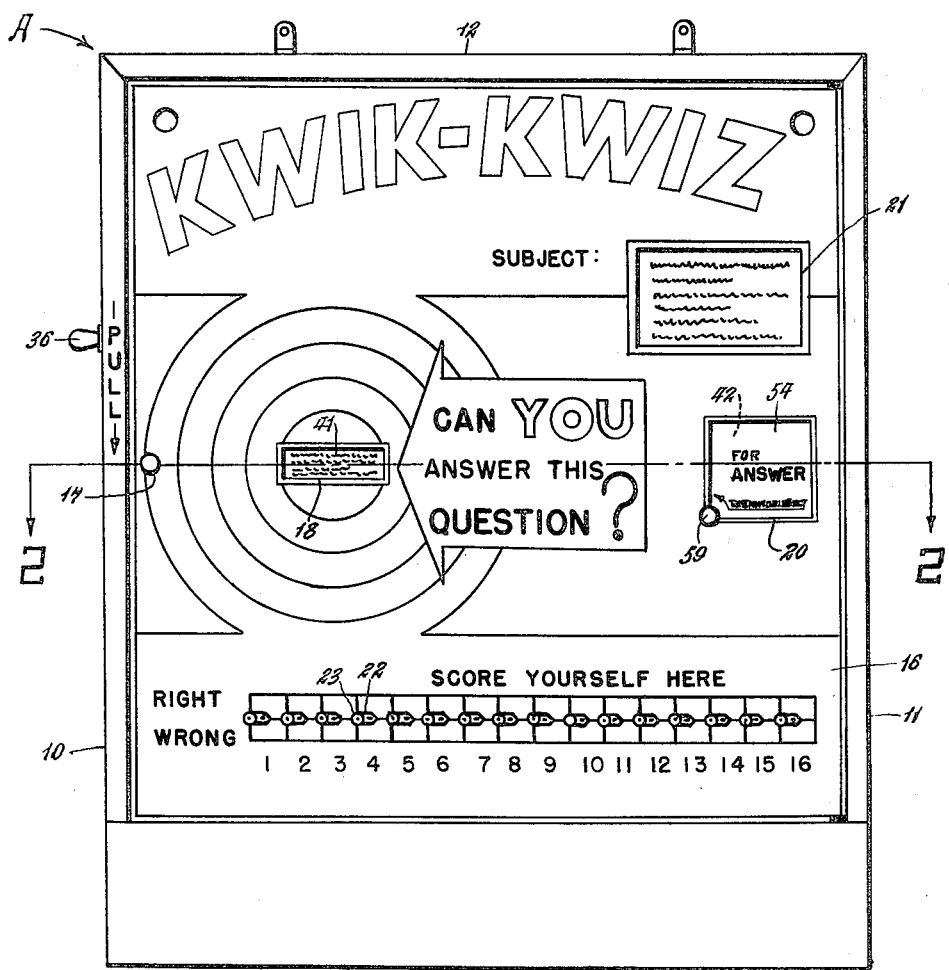
Figure 1 is a front elevation of the complete question and answer device looking from the door side of said device.

For convenience this invention will be described precisely as shown, but it is to be understood that the scope of the invention is to be measured solely by the fundamental novelty of the invention and the scope of the appended claims.

The cabinet A of the invention comprises the side walls 10 and 11 and the upper wall 12 and the lower wall 13. These are all suitably secured to a rear wall 14. Hinged to the aforesaid box-like structure on hinges 15 is a door 16 provided with a knob 17. This door has an aperture 18 which will hereafter be called a question aperture and is also provided with an opening 20 which will hereafter be called the answer opening. The internal mechanism is so arranged that whenever a question is exposed in the question opening 18 its corersponding answer is exposed in the answer opening 20. The rectangular space 21 on the cover is used to hold whatever replaceable card is being used to denote the particular subject covered by the questions and answers.

Because of the psychological factors involved in a device of this character, the lower front portion of the cover 16 is provided with means whereby each individual using the device can score himself as to the number of questions which he has answered correctly. This scoring device consists of a plurality of indicator fingers 22, each of which is pivoted on an individual pivot 23 on aforesaid cover 16 and is capable of being swung upwardly to denote a correct answer and swung downwardly to denote an incorrect answer. Each indicator arm 22 corresponds, of course, to the right or wrong answer to one of the questions which the person using the device has accomplished. The number of indicators which are up and down indicates what might be termed the "score" of the individual using the device.

This, it will be noted, is quite similar to an ordinary voting machine and therefore is easily understood as to its operation by the user of the question and answer device.

Figure 2:
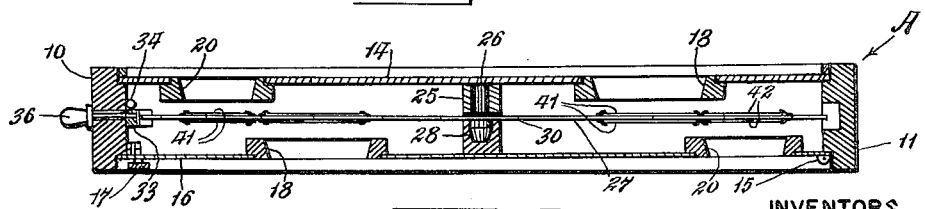
Figure 2 is a horizontal section thereof taken on line 2—2, Figure 1.
Figure 3:
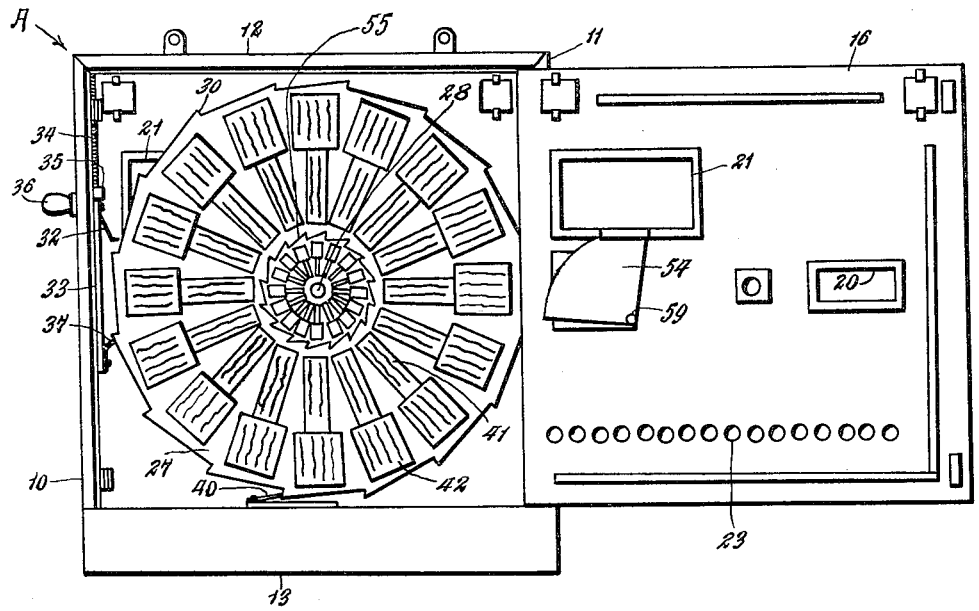
Figure 3 is a diminutive front elevation of the entire device showing the door in its open position.

Referring now to Figure 2, the medial portion of the front face of the rear wall 14 is provided with a block 25 in which is rotatably arranged the trunion 26. To this trunion is detachably connected a question and answer disk 27 which is detachably connected to said trunion by a taper nut 28 so that when the door 16 is swung back upon its hinges 15 this nut 28 may be unscrewed and the question and answer disk 27 removed from the trunnion 26.

The question and answer disk 27 is provided with a plurality of ratchet teeth 30 at the root of each of which is a locking notch 31. These ratchet teeth 30 are adapted to be successively engaged by a pawl 32 which is secured to a slide 33 which latter is vertically slidable in the left wall 10 of the cabinet. This slide is normally resiliently urged upwardly by a spring 34 against the stop 35 which latter is secured to aforesaid wall 10. Projecting through said wall 10 and secured to side slide 33 is an operating knob 36 which is adapted to be manually pressed downwardly whenever the operator of the device desires to look at a new question and answer. In Figure 5 the slide 33 is shown in its fully retracted position, whereas in Figure 6 said slide is shown in its fully advanced position.

Just before the disk reaches the fully advanced position of Figure 6 the pawl 32 is adapted to strike against a pressure tongue 37, attached to the wall of the cabinet, which forceably forces the toe 38 of the pawl 32 into said locking notch 31. This provides a positive connection between the pawl 32 and the disk 14 so that when the manual pressure on the knob 36 is released the disk is positively turned backwardly a small distance until the lowermost of its ratchet teeth 30 strikes against a resilient detaining arm 40.

Figure 4:
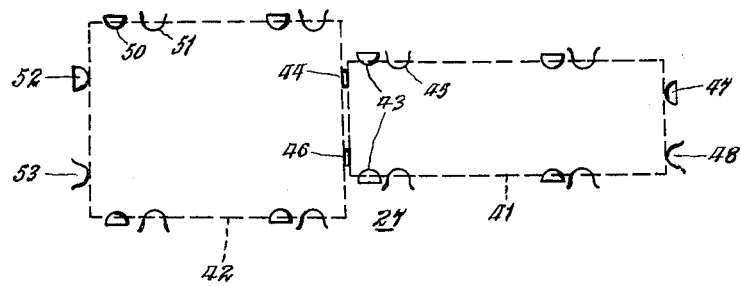
Figure 4 is an enlarged fragmentary front elevation of a portion of the question and answer carrying disk showing the same with one of the answer cards and one of the question cards removed therefrom.

Both the front and the rear faces of the disk 27 are adapted to carry question cards 41 and answer cards 42. This constitutes two sets of questions and answers which may be related to each other if desired or which may be totally unrelated depending upon the character of the subject card 21. Each question and answer card is detachably arranged in the disk 27, as best shown in Figure 4. This shows a plurality of lateral guides 43 for the question card 41 which is on the front face of the disk 27 and also a stop 44. The question card 41 which is on the rear face of the disk 27 is guided by the lateral guides 45 and is stopped by the stop 46. Additional stops for the question card 41 may be provided if desired such as the stop 47 for the front question card and the stop 48 for the rear question card. Similarly, the plurality of lateral guides 50 are provided for the front answer card 42 and similar stops 51 formed to provide guides for the rear answer card 42. A stop 52 may also be provided for the front answer card and a stop 53 for the rear question card.

For psychological reasons it is desirable to conceal the answer to whatever question is being asked until the person using the machine has given a definite answer to said question. For this purpose a shutter 54 is provided on the cover 16, said cover being connected to the knob 59 which is suitably pivoted on the cover 16. Thus when the person using the machine has decided what his answer is, he pivotally opens said shutter 54 and ascertains whether or not he has been correct and then turns up or down the last one of the indicator fingers 22 so as to add or subtract from the score he has already won or lost.

For convenience in replacing the question and answer cards on either the front or rear face of the disk 27, the central part of each face of said disk is stamped with an inked configuration 55 which simulates the main operating features of said disk and its question and answer cards. This enables the cards to be accurately located so that each question and its corresponding answer are in the diametrically opposite position so as to be properly aligned when exposed through the sight openings 18 and 20.

We claim:

1. A question and answer mechanism comprising: a frame; a disk rotatably mounted on said frame and having ratchet teeth formed on its periphery and having a locking notch formed at the base of each ratchet tooth; a set of questions and corresponding answers removably arranged on said disk; a slide arranged slidably on said frame so as to move in a direction perpendicular to a radius of said disk; a stop on said frame arranged to limit the retractive movement of said slide; resilient means urging said slide toward its fully retracted position; an operating knob connected with said slide and projecting out through a slit in said frame so as to be operable from the exterior of said frame; a resilient pawl arranged on said slide and adapted to engage successive ratchet teeth of said disk when said slide is manually moved forwardly; a toe connected with the outer end of said pawl and extending obliquely outwardly therefrom; a pressure tongue connected with said frame and adapted to bear upon said pawl and force the toe of said pawl into a locking notch as said slide is moved toward its extreme forward position; and a detaining arm connected with said frame and adapted to prevent said pawl from turning said disk an excessive distance in a reverse direction.

2. A question and answer mechanism as in claim 1 with the detaining arm being resilient.

3. A question and answer mechanism as in claim 1 with the toe of the pawl being integral with the pawl.

4. A question and answer mechanism as in claim 1 with a set of questions and answers being arranged on each side of the disk.

References Cited in the file of this patent

UNITED STATES PATENTS

| | | |
|---|---|---|
| 468,475 | Sapp | Feb. 9, 1892 |
| 739,201 | Morton | Sept. 15, 1903 |
| 971,865 | Stocklmier | Oct. 4, 1910 |
| 986,416 | Young | Mar. 7, 1911 |
| 2,048,954 | Shokler | July 28, 1936 |
| 2,098,003 | Hassenfeld | Nov. 2, 1937 |
| 2,178,906 | Haumerson | Nov. 7, 1939 |
| 2,317,107 | Oesch | Apr. 20, 1943 |
| 2,385,732 | Redding | Sept. 25, 1945 |

FOREIGN PATENTS

| | | |
|---|---|---|
| 366,820 | France | Aug. 10, 1906 |
| 377,389 | Italy | Dec. 16, 1939 |